US009102405B2

(12) United States Patent
Zhang et al.

(10) Patent No.: US 9,102,405 B2
(45) Date of Patent: Aug. 11, 2015

(54) CABLE-TETHERED HELICOPTER SURVEILLANCE SYSTEM

(71) Applicant: Princetel Inc., Hamilton, NJ (US)

(72) Inventors: Boying B. Zhang, Lawrenceville, NJ (US); Zelei Guan, Piscataway, NJ (US); Hong Zhang, North Brunswick, NJ (US); Louis D. Violante, Monroe, NJ (US)

(73) Assignee: Princetel Inc., Hamilton, NJ (US)

( * ) Notice: Subject to any disclaimer, the term of this patent is extended or adjusted under 35 U.S.C. 154(b) by 166 days.

(21) Appl. No.: 13/908,137

(22) Filed: Jun. 3, 2013

(65) Prior Publication Data

US 2014/0353421 A1  Dec. 4, 2014

(51) Int. Cl.
*B64C 27/00* (2006.01)
*B64C 39/02* (2006.01)
*B64C 27/04* (2006.01)

(52) U.S. Cl.
CPC .............. *B64C 39/022* (2013.01); *B64C 27/04* (2013.01); *B64C 39/024* (2013.01); *B64C 2201/024* (2013.01); *B64C 2201/027* (2013.01); *B64C 2201/127* (2013.01)

(58) Field of Classification Search
USPC ................ 244/17.11, 6, 17.13, 158.2; 701/3; 343/705, 708
See application file for complete search history.

(56) References Cited

U.S. PATENT DOCUMENTS

| | | | | |
|---|---|---|---|---|
| 2,995,740 | A | * | 8/1961 | Shreckengost ................. 342/58 |
| 3,149,803 | A | * | 9/1964 | Petrides et al. ............ 244/17.13 |
| 3,217,097 | A | * | 11/1965 | Pauli et al. .................... 348/144 |
| 3,223,358 | A | | 12/1965 | Quick |
| 3,226,059 | A | | 12/1965 | Paterson et al. |
| 4,058,277 | A | * | 11/1977 | Kozakiewicz et al. ..... 244/17.17 |
| 5,015,187 | A | * | 5/1991 | Lord ................................ 434/33 |
| 7,510,142 | B2 | * | 3/2009 | Johnson ..................... 244/17.17 |
| 7,631,834 | B1 | * | 12/2009 | Johnson et al. ............ 244/17.17 |
| 8,602,349 | B2 | * | 12/2013 | Petrov ......................... 244/17.23 |
| 8,738,198 | B2 | * | 5/2014 | Schempf ........................... 701/2 |
| 8,777,157 | B2 | * | 7/2014 | Barrett et al. .................. 244/115 |
| 2011/0315810 | A1 | * | 12/2011 | Petrov ......................... 244/17.23 |
| 2013/0233964 | A1 | * | 9/2013 | Woodworth et al. ............. 244/2 |

FOREIGN PATENT DOCUMENTS

WO  WO2013052178 A2 *  6/2012

* cited by examiner

*Primary Examiner* — Christopher P Ellis

(57) ABSTRACT

The invention aims to transfer a substantial volume of high-quality, high-volume real-time data, which currently cannot be achieved by wireless techniques, between a mobile airborne observation platform and the ground station via a tethered fiber connection between said platform and said ground station.

2 Claims, 1 Drawing Sheet

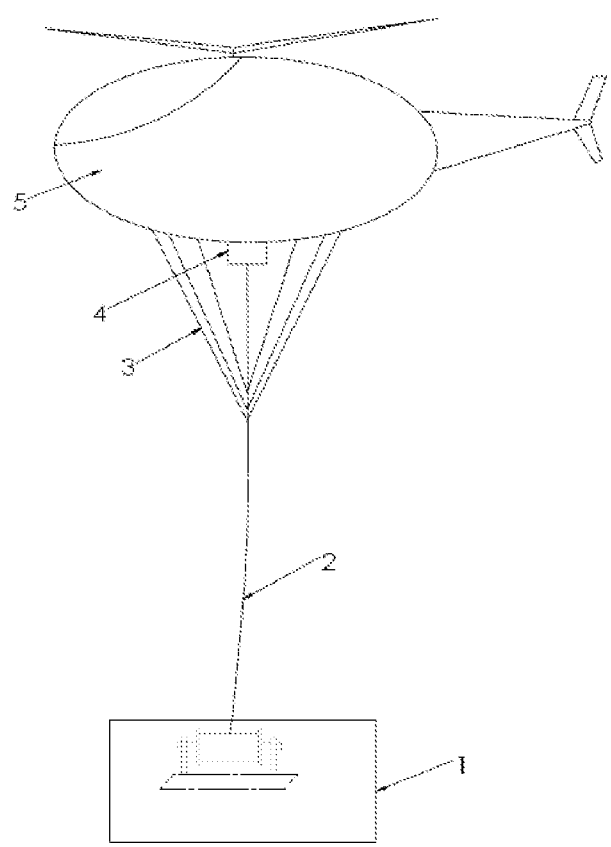

CABLE-TETHERED HELICOPTER SURVEILLANCE SYSTEM

CROSS REFERENCE TO RELATED APPLICATIONS

This application claims benefit to provisional application No. 61/673,040, filed on Jul. 18, 2012, which is incorporated by reference herein in its entirety.

STATEMENT REGARDING FEDERALLY SPONSORED RESEARCH OF DEVELOPMENT (Not Applicable)

THE NAMES OF THE PARTIES TO A JOINT RESEARCH AGREEMENT (Not Applicable).

INCORPORATION-BY-REFERENCE OF MATERIAL (Not Applicable).

STATEMENT REGARDING PRIOR DISCLOSURES BY THE INVENTOR (Not Applicable).

BACKGROUND OF THE INVENTION

The present invention relates to a tethered helicopter surveillance system, and more particularly, to a system with a helicopter tethered by cable for data transfer.

In the past, it has been proposed to mount a camera on helicopters and to control the position and attitude of the helicopters so that the line of sight of the camera, usually a television camera, is accurately positioned in space.

This prior proposal suffers from the disadvantage that it is virtually impossible to angularly stabilize a rotating helicopter sufficiently to meet the image clarity and resolution requirements of a camera mounted thereon.

Applicants have overcome these disadvantages by isolating the camera from the helicopter and mounting the camera on a gyroscopically stabilized platform whilst permitting the helicopter to move in angular attitude relatively thereto.

In this invention, the surveillance system is generally equipped with a helicopter with at least one propeller or rotor allowing vertical takeoff and hovering; a camera or sensor system for gaining useful information relative to the helicopter's immediate surroundings as well as the land, sea and sky area within sight of the aircraft; and a tethered cable for transferring information to the ground station.

Such a system is useful where it is desirable to observe surrounding areas, such as in reconnaissance by field troops, or in civilian work that requires observation from a distance.

BRIEF SUMMARY OF THE INVENTION

The invention aims to transfer a substantial volume of high-quality, high-volume real-time digital data, between a mobile airborne observation platform with a media converter, which is gyroscopically stabilized in a helicopter, and the ground control station via a tethered fiber connection and a fiber optic rotary joint between said platform and said ground station. The fiber-optic rotary joints allow for free rotation of fiber while maintaining excellent coupling efficiency.

BRIEF DESCRIPTION OF THE SEVERAL VIEWS OF THE DRAWING

FIG. 1: A schematic representation depicting certain principles of operation of the present invention.

DETAILED DESCRIPTION OF THE INVENTION

The helicopter may take a variety of shapes and sizes. A single main rotor shape such as is shown in FIG. 1 is quite suitable, although helicopters having other configurations (such as tandem rotor helicopters, Quadrotor helicopters, and other types of multicopter) could be utilized. The power sources of the helicopter include battery, solar, line power, gen-set, and gas.

The tethered cable includes an optical fiber, an electrical wire (if needed), and/or other media transfer wires.

FIG. 1 illustrates, schematically, the surveillance helicopter (5) being utilized. A gyroscopically stabilized platform (4) is attached underneath of the helicopter (5). The camera and/or sensor system with media converters is located within the gyroscopically stabilized platform (4). A cable (2) connects the gyroscopically stabilized platform (4) to the ground station (1) for data and/or power transfer, which is supported by way of harness lines (3). The cables (2) do not produce any force on the helicopter (5) The ground station may include a fiber rotary joint, an electrical slip ring, a cable reel, media converters, control system, and any number of additional equipment needed for the safe and effective control of the helicopter, the camera and any other sensors.

The fiber optic rotary joint IS a mean to pass signals across rotating interfaces, particularly when transmitting large amounts of data. These signals can carry video, audio, data, control, power, or other information. Fiber rotary joint allows for free rotation of fiber while maintaining excellent coupling efficiency, because no physical contact occurs between two aligned fibers.

Media converters are also called fiber links, fiber modems, fiber transmitters/receivers, or transceivers. They convert video, audio, data, or control signals (analog or digital) into optical signals, which are then converted back to electrical signals at the remote end.

In operation, the helicopter (5) lifts up all the components of the invention, except the ground station (1), to a certain altitude while the cable (2) is connected to the ground station (1). The camera and/or sensor system, locating within the gyroscopically stabilized platform (4) captures useful information relative to the helicopter's immediate surroundings. All the information is converted by media converters and transferred from the camera and/or sensor system to the ground station (1) through the cable (2) in real time.

Furthermore, the transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinary associated with the specified material(s). The term "consisting essentially of" limits the scope of a claim to the specified elements, steps or material(s) and those that do not materially affect the basic and novel characteristic(s) of the claimed invention. The supported, mixed metal oxide catalyst, its methods of preparation and use can in alternate embodiments, be more specifically defined by any of the transitional terms comprising", "consisting essentially of" and "consisting of".

We claim:
1. A tethered aerial surveillance platform consisting comprising:
   a helicopter;
   a plurality of sensors located within a gyroscopically stabilized platform;
   a plurality of cameras located within a gyroscopically stabilized platform;
   a ground station from which the helicopter can be controlled; and
   a tether which connects the ground station to the helicopter and contains a plurality of optical fibers to transfer the data gathered by the helicopter to the ground station as well as send control signals from the ground station to the helicopter.

2. A tethered aerial surveillance platform comprising:
   a helicopter;
   a fiber optic rotary joint;
   a plurality of media converters;
   a plurality of sensors located within a gyroscopically stabilized platform;
   a plurality of cameras located within a gyroscopically stabilized platform;
   a ground station from which the helicopter can be controlled; and
   a tether which connects the ground station to the helicopter and contains a plurality of optical fibers to transfer the data gathered by the helicopter to the ground station as well as send control signals from the ground station to the helicopter.

* * * * *